INVENTORS.
LENNART JOHANNES BLOCH VON BLOTTNITZ
BURHL STUART DYKHOUSE
BY

ATTORNEY

United States Patent Office 3,532,218
Patented Oct. 6, 1970

3,532,218
APPARATUS FOR FLOCCULATING AND THICKENING
Lennart Johannes Bloch von Blottnitz, Blairgowrie, and Burhl Stuart Dykhouse, Bryanston, Republic of South Africa, assignors to American Cyanamid Company, Stamford, Conn., a corporation of Maine
Filed July 11, 1967, Ser. No. 652,595
Int. Cl. B01d 21/08
U.S. Cl. 210—207          1 Claim

ABSTRACT OF THE DISCLOSURE

Pulps of ores or products of mineral dressing operations are flocculated with standard flocculating agents, such as water soluble, high molecular weight polymers, polyacrylamides, guar, and the like, the flocculating agent being in extremely dilute solution, less than 10 p.p.m., instead of the conventional 1,000 to 10,000 p.p.m. The addition is carried out so that contact with the pulp to be flocculated first occurs where there is an excess of the dilute flocculating agent solution. Higher settling rates are obtained with smaller amounts of flocculant. The process is primarily useful with very slimy pulps.

BACKGROUND OF THE INVENTION

Thickening and settling are procedures which are used in mineral dressing in order to increase the solids content of and de-water an ore pulp. With coarse suspensions relatively free from slimes, usually no problem is presented, but when finely divided material is present, as in slimy products, settling or thickening becomes uneconomically slow, and it is therefore standard practice to add agents which will cause flocculation of the very fine particles. Lime is often used, and a number of flocculating agents have been developed, such as water soluble, high molecular weight polymers, polyacrylamides, hydrolyzed polyacrylamides and polyacrylonitriles, copolymers of acrylamide and acrylic acid, sulfonated polystyrenes, polyethylenimines, guar, and the like. These flocculants may be anionic, cationic and non-ionic in nature.

These various flocculation procedures have been effective and are very extensively used. However, with very slimy products, the amount of flocculant required can be quite high and, correspondingly, the cost of flocculation increases, often to uneconomic levels. It should be realized that in most thickening procedures one is dealing with materials which are often present in large proportions in an ore and have to be thickened cheaply. Cost is, therefore, a vital factor, and so in many cases it has been necessary to tolerate slower settling rates because in some cases costs of oversized equipment may be lower than the continuing cost of flocculating agents. Every settling or thickening process involving slimy material, therefore, represents a compromise between flocculant cost and equipment output.

SUMMARY OF THE INVENTION

The present invention uses flocculating agents of the organic chemical type, such as high molecular weight, water soluble polymers, polyacrylamides, hydrolyzed polyacrylamides and polyacrylonitrile, copolymers of acrylamide and acrylic acid, sulfonated polystyrene, polyethylenimine and guar products and the like in very great dilution, orders of magnitude greater than customarily used. Instead of using flocculant solutions containing from 1,000 to 10,000 p.p.m. (0.1 to 1.0%), the dilutions are so great that the concentration of flocculating agent is less than 10 p.p.m.; and with certain products considerably greater dilutions, down to 1 p.p.m. or less, are used. The addition is carried out so that contact with the pulp to be flocculated first occurs where there is an excess of the dilute flocculating agent solution. This can be effected, for example, by introducing the pulp into the dilute solution of the flocculating agent. Markedly greater settling rates are obtained than with customary dilutions, and often at reagent consumptions, in pounds per ton, which are considerably less. The overall result is a great reduction in cost of reagent and better utilization of equipment because the higher settling rates increase the output per equipment unit.

While it is an advantage of the present invention that is can be used in many types of equipment, sometimes with relatively cheap and minor modifications, it has been found that for many purposes a modified deep well thickener of the Cross type gives improved results, and in this aspect, therefore, the invention also includes an improved thickening apparatus. However, principally the invention is a process one and is not limited to any particular apparatus.

The Cross type thickener is modified by having a solid deep well instead of a slotted one, with the top part of the deep well lowered to be at a height equal to the height of the surrounding supernatant solution. A circular pipe, containing a number of drilled holes, is fastened on top of the deep well and used to introduce the dilute flocculating agent to effect additional dilution by relatively clear supernatant solution circulating in the thickener and caused by the modification of the deep well. The pulp is introduced into the closed bottom feed well which is fastened to the central thickener shaft. As a result, the pulp overflows the feed well into the large volumes of dilute flocculating agent and recirculated supernatant solution. This is one convenient way of producing the conditions of first contact of the pulp with the flocculating agent solution under the necessary conditions set out above.

The invention is primarily of importance with slimy products and is particularly useful with such very slimy material as weathered kimberlite, clays, tailings from gold cyanidation of South African ores, flotation tailings and the like. The invention, of course, is not limited to the treatment of any particular ore or product, but does not give significant advantages unless very fine materials are present and so is often not needed with relatively coarse products. Particle size alone is, of course, not the only factor which raises the problem that can be solved by the improved flocculation and settling of the present invention as certain materials, even though quite fine, have surface characteristics so that they are not at all slimy. Therefore, the present invention is not limited to any exact upper limit on particle size, this varying greatly with particular materials.

The present invention can be used in major settling and flocculation problems where there are very large volumes and tonnages to be handled and is also effective in the clarification of overows from classifiers which have treated certain other materials. For example, in many cases the invention is extremely effective in the clarification of hydrocyclone classifier overflows. The versatility of the process of the present invention, which can be used with various other equipment and various other processes in mineral dressing, represents a distinct practical advantage.

The establishment of the proper conditions of the zone where the pulp first strikes the dilute flocculating agent solution can be readily effected in the laboratory by pouring the pulp into a graduate which already has the required amount of the very dilute solution of the flocculant. The pulp passes rapidly through the first zone of contact, and essentially this is the same procedure as results in the use of a modified deep well thickener, which has been described above. In the laboratory this is a simple and practical method of achieving the proper results in the zone where the pulp first contacts the solution of flocculating agents, but of course in large scale operations it is possible to produce these conditions without using gravity to cause pulp to sink through a dilute solution of the flocculating agent.

It is not known exactly what the mechanism is which produces the greatly improved settling rates with the dilute flocculant feeds of the present invention, and it is not desired to limit the invention to any theoretical mechanism.

Another factor, particularly with very dilute suspensions, has been noted. If the dilution of the flocculating agent is effected with turbid overflow water or water containing appreciable amounts of soluble salts, the efficiency is considerably decreased over that obtained when the flocculating agent is diluted with relatively clean water. In some cases the decrease in effectiveness may be from 20% to 40%. Therefore, it is a preferred modification of the present invention to use relatively clean water for forming the extremely dilute solutions of the flocculants, and in a more specific aspect of the invention this feature is included. In broader aspects the invention is not limited to the nature of the water which is used in making up the very dilute flocculant solution. The increased efficiencies obtainable by the present invention are so great that even with dilute solutions made up with water which is somewhat turbid, greatly improved results are obtainable over the flocculation procedures which have been used in the past.

It is another advantageous feature of the present invention that it is not particularly pH sensitive. This is of practical value because some clarification or settling processes are in fairly acid media. For example, it is possible to add very fine coal dust, coal plant refuse, and the like to certain mine waters to absorb certain undesirable products so that the mine waters can be returned to streams without excessive pollution. However, when such a procedure is used it is necessary to remove or greatly reduce the solids content by clarification because even though the solids may not be chemically undesirable, they may impart severe color, which makes the addition to streams of highly colored effluent undesirable or even illegal. It is an advantage of the present invention, therefore, that it can be used in some such procedure where it is necessary to clarify effluents which have somewhat acid pH. The increased efficiency of the extremely dilute flocculant of the present invention to some cases increases the clarification efficiency sufficiently even in acid pH's so that the procedure becomes practical economically.

DESCRIPTION OF THE PREFERRED EMBODIMENTS

Figure 1:
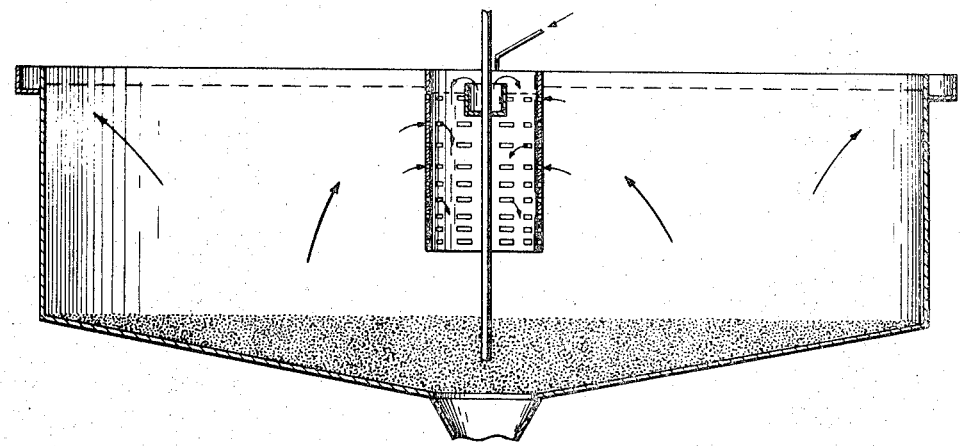
FIG. 1 is a cross section through an ordinary Cross deep well thickener.

FIG. 1 is an ordinary Cross deep well thickener with a slotted well.

Figure 2:
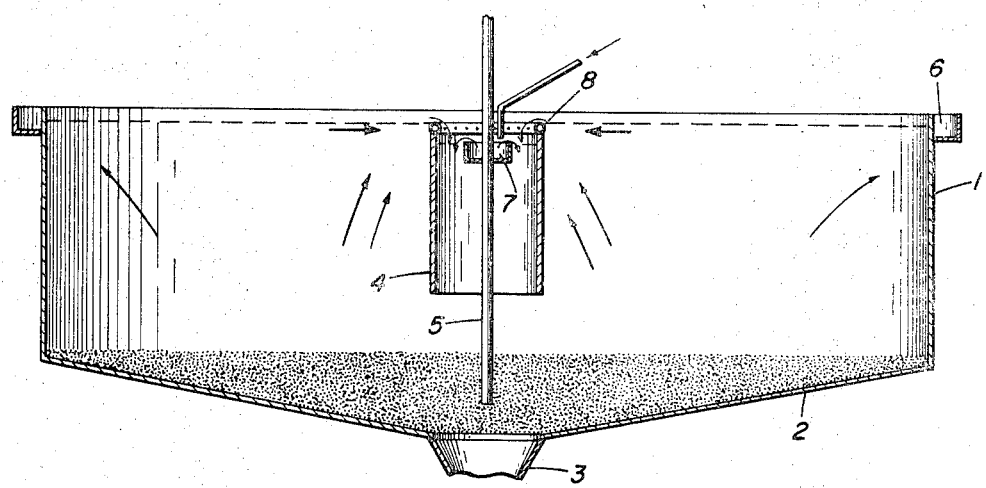
FIG. 2 is a similar section through a thickener modified in accordance with the present invention.

FIG. 2 shows a modified Cross deep well thickener having a peripheral wall 1, sloping bottom 2 with an opening 3 for solids underflow. The deep well 4 is not slotted as is normal with the Cross deep well thickener, FIG. 1, but is solid and lowered to a height similar to the surrounding solution so that circulation of the water in the thickener is as shown by the arrows. Feed of the suspension under treatment is as usual in deep well thickeners. The thickener main shaft 5 is also positioned as usual. The conventional overflow launders are shown at 6. Dilute flocculating agent is introduced through the drilled ring pipe 8 positioned on top of the deep well. In a conventional thickener dilute flocculating agent is added to the pulp before reaching the feed well 7.

The modified deep well thickener is very effective with many materials which are difficult to settle or flocculate, such as weathered kimberlite, products from the flotation of South African gold ore, and the like, but of course the invention is in no sense limited to the use of the improved thickener.

In many of the examples which follow, quantitative comparative tests are set forth. It is, of course, not practical to effect these extensive quantitative tests in full scale equipment, and they are, therefore, carried out in the laboratory. However, the procedure which has been set out above is followed, that is to say, a graduate is filled with the proper amount of dilute flocculant solution and the pulp then poured through it.

EXAMPLE 1

A deep well thickener, as described in the drawings, was used with weathered, slimy kimberlite, the pulp density being 1.05. A solution of high molecular weight polyacrylamide, sold by the American Cyanamid Company under their designation Superfloc® 127 Flocculant, was introduced around the inner portion of the deep well and the pulp was introduced into the feed well 7. It will be seen that the pulp overflows the edges of the feed well 7 and goes down through the surrounding dilute solution of the flocculant. This flow is similar to that which is obtainable in laboratory tests, as has been described above.

EXAMPLE 2

A series of tests were made by the laboratory test procedure described above using the flocculant of Example 1. The materials used were from a typical gold mine in South Africa and included thickener feed with and without lime, overflow from a cyclone classifier and tailings from flotation rougher cells. The results are summarized in the following tables, and some of the results are also shown. In each case there was a blank with no flocculant added.

TABLE 1.—SETTLING RATES AT pH 6.2 FLOCCULANT THICKENER FEED

| Reagent | | | |
|---|---|---|---|
| Solution strength, percent | Addition, lbs./ton | Pulp S.G. at settling start | Settling rate ins./min. |
|  | Blank | 1.23 | 0.071 |
| 0.1 | 0.002 | 1.24 | 0.075 |
| 0.1 | 0.005 | 1.24 | 0.090 |
| 0.1 | 0.010 | 1.24 | 0.103 |
| 0.1 | 0.020 | 1.24 | 0.184 |
| 0.01 | 0.005 | 1.26 | 0.106 |
| 0.01 | 0.005 | 1.26 | 0.118 |
| 0.000095 | 0.005 | 1.26 | 0.250 |
| 0.01 | 0.020 | 1.26 | 0.202 |

TABLE 2

| Reagent | | | |
|---|---|---|---|
| Solution strength, percent | Addition, lbs./ton | Pulp S.G. at settling start | Settling rate, ins./min. |
|  | Blank | 1.23 | 0.081 |
| 0.1 | 0.005 | 1.23 | 0.083 |
| 0.01 | 0.005 | 1.23 | 0.197 |
| 0.000092 | 0.005 | 1.23 | 0.425 |
| 0.00004 | 0.002 | 1.23 | 0.302 |

TABLE 3.—SETTLING RATES AT pH 6.15 OF CYCLONE OVERFLOW

| Reagent | | | |
|---|---|---|---|
| Solution strength, percent | Addition, lbs./ton | Pulp S.G. at settling start | Settling rate, ins./min. |
|  | Blank | 1.080 | 0.126 |
| 0.1 | 0.010 | 1.080 | 0.259 |
| 0.01 | 0.010 | 1.080 | 0.461 |
| 0.001 | 0.010 | 1.080 | 0.515 |
| 0.001 | 0.010 | 1.180 | 0.511 |
| 0.000065 | 0.010 | 1.080 | 0.998 |
| 0.00013 | 0.020 | 1.080 | 1.14 |
| 0.0000325 | 0.005 | 1.080 | 0.748 |
| 0.0000325 | 0.005 | 1.080 | 0.591 |
| 0.000013 | 0.002 | 1.080 | 0.403 |

TABLE 4.—SETTLING RATES AT pH 6.65 OR ROUGHER TALINGS

| Reagent | | | |
|---|---|---|---|
| Solution strength, percent | Addition, lbs./ton | Pulp S.G. at settling start | Settling rate, ins./min. |
| -------- | Blank | 1.31 | 0.103 |
| 0.1 | 0.005 | 1.32 | 0.151 |
| 0.01 | 0.005 | 1.34 | 0.236 |
| 0.001 | 0.005 | 1.33 | 0.354 |
| 0.00013 | 0.005 | 1.32 | 0.551 |

It will be seen that a very great increase in settling rate occurred when the dilution reached figures of less than 100 p.p.m. and, particularly with cyclone overflow, extremely high settling rates were obtained with dilutions of approximately 1 p.p.m. It should be noted that the cyclone overflow figures used fresh, clear water for dilution. As pointed out above, the figures are not as good when dilution is effected with turbid water.

Table 1 shows that with dilutions of less than 1 p.p.m. and amounts of only 0.005 lbs./ton, excellent settling rates were obtained. Acceptable results could be obtained with 100 p.p.m. when the amount of reagent was increased four times.

At slightly higher pH, Table 2 shows even greater efficiencies than can be obtained with large amounts of lime and this even when the amount of flocculant was reduced to 0.002 lbs./ton. Tables 3 and 4 show even greater settling rate.

The economics based on South African prices of flocculants are quite interesting. Even at pH 6.2 the best results represented a fluocculant cost of only 0.45 cents per ton. At pH 5 this cost dropped to 0.18 cents per ton, and the enormous increase in settling rate with cyclone overflow were obtained at the same cost. The best results with rougher tailings also required a flocculant cost of only 0.45 cents per ton, which is better than normal plant performance.

EXAMPLE 3

Laboratory tests were made with a cyclone overflow from a different gold mine, the overflow being from pyrite flotation tailings. The flocculant, which was also a polyacrylamide, is of a different molecular weight, considerably less than that of the Superfloc® 127 Flocculant of Example 2. This flocculant is sold by the American Cyanamid Company under their designation Superfloc® 16 Flocculant. The results appear in Table 5.

TABLE 5

| Reagents | | Pulp, percent solids | Settling rate, ins./min. | Remarks |
|---|---|---|---|---|
| Strength, percent | Lbs./ton | | | |
| -------- | Blank | 15.7 | 0.072 | |
| 0.1 | 0.0050 | 15.5 | 0.108 | |
| 0.01 | 0.0049 | 15.2 | 0.139 | |
| 0.001 | 0.0048 | 15.7 | 0.300 | |
| 0.0001 | 0.0050 | 15.7 | 0.866 | |
| 0.0001 | 0.0050 | 15.7 | 0.520 | Flocculant diluent with cloudy supernatant. |

All of the dilutions of flocculant were made with clear water and increases over the standard dilution of 0.1% amounted to eight times. It will also be noted that the Superfloc® 127 Flocculant of Example 2 was somewhat more effective with the different ores than the Superfloc® 16 Flocculant in Example 3.

We claim:
1. In a deep well thickener including a main thickener chamber, the improvement comprising a vertically disposed cylindrical deep well having an imperforate wall with its upper end at the surface of the liquid in said chamber surrounding said deep well and means for introducing flocculant solution to the upper inner periphery of said deep well, said means comprising a ring pipe mounted on the upper end of said deep well, said ring pipe being provided with orifices there-around for discharge within said deep well.

References Cited

UNITED STATES PATENTS 2,274,361 2/1942 Darby _____ 210—42 X
2,678,730 5/1954 Coulter _____ 210—84 X

FOREIGN PATENTS 901,916 7/1962 Great Britain.

MICHAEL E. ROGERS, Primary Examiner

U.S. Cl. X.R.

210—54, 209, 519